(12) United States Patent
Yun et al.

(10) Patent No.: US 9,883,258 B2
(45) Date of Patent: Jan. 30, 2018

(54) VEHICLE WIRELESS SENSOR NETWORK SYSTEM AND OPERATING METHOD THEREOF

(71) Applicant: ELECTRONICS AND TELECOMMUNICATIONS RESEARCH INSTITUTE, Daejeon (KR)

(72) Inventors: Doo Seop Yun, Daejeon (KR); Do Hyun Kim, Daejeon (KR); Seung Jun Lee, Daejeon (KR); Kyong Ho Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 103 days.

(21) Appl. No.: 14/689,476

(22) Filed: Apr. 17, 2015

(65) Prior Publication Data

US 2015/0350750 A1 Dec. 3, 2015

(30) Foreign Application Priority Data

May 27, 2014 (KR) .......................... 10-2014-0063686

(51) Int. Cl.
*H04Q 9/00* (2006.01)

(52) U.S. Cl.
CPC ........... *H04Q 9/00* (2013.01); *H04Q 2209/40* (2013.01)

(58) Field of Classification Search
CPC .................................. G08C 17/00; H04Q 9/00

USPC ........................................ 340/870.01, 870.07
See application file for complete search history.

(56) References Cited

U.S. PATENT DOCUMENTS

| 2010/0083035 A1* | 4/2010 | Kim ................ H04W 84/18 714/4.1 |
| 2013/0073140 A1* | 3/2013 | Dunst ................ G07C 5/085 701/32.7 |
| 2013/0073143 A1* | 3/2013 | Miura ................ G01C 21/00 701/36 |
| 2013/0275214 A1* | 10/2013 | Kote ................ G06Q 30/0255 705/14.53 |
| 2014/0330453 A1* | 11/2014 | Nakagawa ......... B60H 1/00428 701/2 |

(Continued)

FOREIGN PATENT DOCUMENTS

KR 10-2013-0067453 A 6/2013

*Primary Examiner* — Omar Casillashernandez
(74) *Attorney, Agent, or Firm* — Rabin & Berdo, P.C.

(57) ABSTRACT

Disclosed are a vehicle wireless sensor network system and an operating method thereof. The vehicle wireless sensor network system according to an embodiment of the present invention includes at least one vehicle wireless sensor node that is mounted in a vehicle and detects information about the vehicle in an arbitrary position of the vehicle, and a vehicle base station that collects information from the vehicle wireless sensor node and an electronic control unit (ECU) of the vehicle, generates an information collection command based on the information collected from the ECU of the vehicle to transmit the generated information collection command to the vehicle wireless sensor node to perform the generated information collection command, and selectively transmits sensor information collected from the vehicle wireless sensor node to the ECU of the vehicle.

19 Claims, 4 Drawing Sheets

(56) References Cited

U.S. PATENT DOCUMENTS

2015/0244826 A1\* 8/2015 Stenneth ................. H04Q 9/00
709/213

\* cited by examiner

VEHICLE WIRELESS SENSOR NETWORK SYSTEM AND OPERATING METHOD THEREOF

CROSS-REFERENCE TO RELATED APPLICATION

This application claims priority to and the benefit of Korean Patent Application No. 10-2014-0063686, filed on May 27, 2014, the disclosure of which is incorporated herein by reference in its entirety.

BACKGROUND

1. Field of the Invention

The present invention relates to a vehicle wireless sensor network system and an operating method thereof, and more particularly, to a vehicle wireless sensor network system and an operating method thereof, which may smoothly provide various safety and convenience services for the vehicle to occupants.

2. Discussion of Related Art

According to the rapid development of electronic control technologies, a variety of advanced electronic control technologies are complexly applied to a vehicle, so that the vehicle has gradually become advanced and high-tech.

That is, in order to provide more improved stability and efficiency of traveling to a driver, the structure of the vehicle has gradually become more complicated while an electronic compound control device is grafted onto the vehicle.

Meanwhile, a vehicle communication network between a conventional sensor and an electronic control unit (ECU) may be established through a wired network inside a vehicle such as a controller area network (CAN), a local interconnect network (LIN), a media oriented system transport (MOST), or the like, or established through a wireless network such as Bluetooth or the like.

However, the conventional wired network inside the vehicle that supports CAN, LIN, MOST communication methods, and the like uses shielded copper wires, and therefore expensive wire connection may be complexly constituted, and the installation costs may be further increased when the number of sensors inside the vehicle is increased.

In addition, a wiring harness for a wired sensor network inside the vehicle is 40 Kg or more in its weight and 4 Km or greater in its length, and thereby functions as a factor for reducing vehicle fuel efficiency. Thus, when such a wired network is established or changed, the design and maintenance costs are also increased.

In this manner, in order for the vehicle to be intellectualized, sensors should be disposed in various locations of the vehicle to detect and provide a traveling status of the vehicle in real time, but the sensors cannot be freely disposed inside the vehicle due to the limitation of the wired network, and therefore the intellectualization of the vehicle is bound to be slow.

Meanwhile, Korean Patent Publication No. 10-2013-0067453 relates to a wireless network connection system and method for sensors inside a vehicle.

For example, in the wireless network connection system for sensors inside the vehicle, a wired network inside the vehicle uses shielded copper wires, and therefore expensive wire connection is complexly constituted for the purpose of linkage with the wired network, and the installation costs are also increased along an increase in the number of sensors inside the vehicle.

In addition, a wiring harness for a wired sensor network inside the vehicle is 40 Kg or more in its weight and 4 Km or greater in its length, and thereby functions as a factor for reducing vehicle fuel efficiency.

Meanwhile, in order to achieve intellectualization, the vehicle should receive the traveling status in real time through sensors disposed in various locations.

However, due to the limitation of the wired network such as increases in the design and maintenance costs according to establishment and change of the wired network, the sensors cannot be freely disposed in various locations of the vehicle, and therefore intellectualization of the vehicle proceeds slowly. In addition, the vehicle may wirelessly receive data detected by sensors through a wireless network such as Bluetooth or the like.

However, when a wireless sensor network system is established through the wireless network such as Bluetooth inside the vehicle, power supply cables and the like are needed, and therefore there may be limitations in the installation positions, and the installation costs may be increased.

SUMMARY OF THE INVENTION

The present invention is directed to a vehicle wireless sensor network system, in which a plurality of vehicle wireless sensor nodes mounted in an arbitrary position of a vehicle may detect information about the vehicle, a vehicle base station may transmit information collected from each of the vehicle wireless sensor nodes to an electronic control unit (ECU) of the vehicle when the collected information is information required for providing safety and convenience services of the vehicle, and the vehicle base station may generate an information collection command when information is needed in order to provide the safety and convenience services of the vehicle corresponding to status information acquired from the ECU of the vehicle and transmit the generated command to the vehicle wireless sensor node to perform the generated command.

The present invention is also directed to architecture of a vehicle wireless sensor node, in which the vehicle wireless sensor node may autonomously detect information about a vehicle according to a command received from a vehicle base station in more efficient and stable manner.

The present invention is also directed to architecture of a vehicle base station in which the vehicle base station may perform functions of collecting and analyzing commands from each vehicle wireless sensor node, transmitting information required for providing safety and convenience services of a vehicle to an ECU of the vehicle, acquiring and monitoring status information from the ECU of the vehicle, generating an information collection command when information is needed in order to provide safety and convenience services of the vehicle corresponding to the monitored status information, and transmitting the generated command to a vehicle wireless sensor node to perform the generated command in more efficient and stable manner.

According to an aspect of the present invention, there is provided a vehicle wireless sensor network system including: at least one vehicle wireless sensor node that is mounted in a vehicle and detects information about the vehicle in an arbitrary position of the vehicle; and a vehicle base station that collects information from the vehicle wireless sensor node and an electronic control unit (ECU) of the vehicle, generates an information collection command based on the information collected from the ECU of the vehicle to transmit the generated information collection command to the vehicle wireless sensor node to perform the generated information collection command, and selectively transmits sensor information collected from the vehicle wireless sensor node to the ECU of the vehicle.

According to another aspect of the present invention, there is provided an operating method of a vehicle wireless sensor network system which includes a vehicle base station and at least one vehicle wireless sensor node, including: collecting, by the vehicle base station, information from an ECU of a vehicle and the vehicle wireless sensor node mounted in an arbitrary position of the vehicle; generating an information collection command based on the information collected from the ECU of the vehicle, and transmitting the generated information collection command to the vehicle wireless sensor node to perform the generated information collection command; and selectively transmitting sensor information collected from the vehicle wireless sensor node to the ECU of the vehicle.

According to still another aspect of the present invention, there is provided a vehicle base station included in a vehicle wireless sensor network system which includes at least one vehicle wireless sensor node, including: a real-time vehicle sensor data and command processing module that sets a priority of information received from each of the at least one vehicle wireless sensor node mounted in an arbitrary position of a vehicle according to a provision service of the vehicle and a kind of each sensor which correspond to each of the at least one vehicle wireless sensor node, and processes information received according to the set priority; a vehicle sensor data management module that transmits, to an ECU of the vehicle, information concerning the provision service of the vehicle among the information processed by the real-time vehicle sensor data and command processing module; a vehicle sensor node failure management module that manages failure information including at least one of information about lack of a battery residual amount of the vehicle wireless sensor node and information about abnormality thereof among the information processed by the real-time vehicle sensor data and command processing module; an ECU status information collection module that transmits an information request command to the ECU of the vehicle, and collects information according to the transmitted information request command from the ECU; and an ECU status information monitoring module that monitors the information collected from the ECU, generates an information collection command corresponding to the monitored information, and transmits the monitored information to the real-time vehicle sensor data and command processing module so as to transmit the generated information collection command to the vehicle wireless sensor node to perform the generated information collection command.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
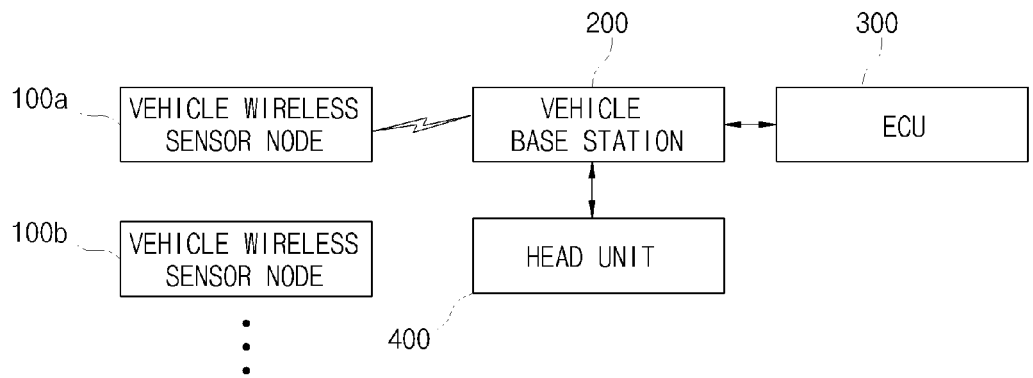
FIG. 1 is a block diagram illustrating a vehicle wireless sensor network system according to an embodiment of the present invention.

Example embodiments of the present invention are disclosed herein. Also, specific structural and functional details disclosed herein are merely representative for purposes of describing the example embodiments of the present invention. However, the example embodiments of the present invention may be embodied in many alternative forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a vehicle wireless sensor network system according to an embodiment of the present invention will be described with reference to FIGS. 1 to 4.

Figure 2:
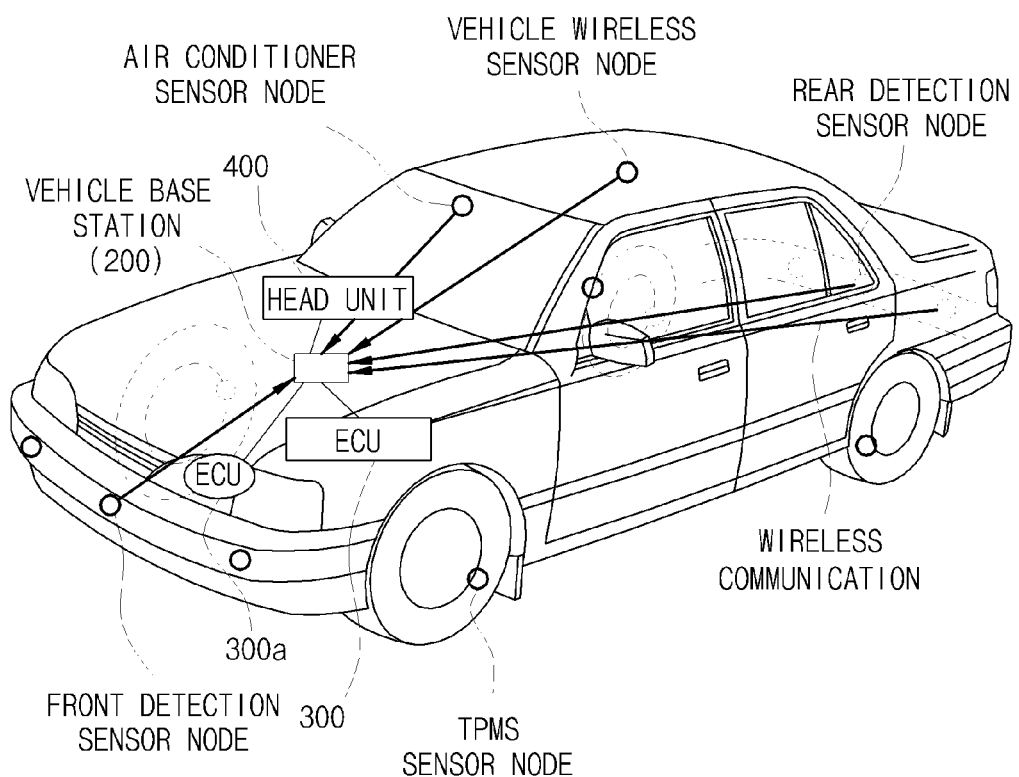
FIG. 2 is a diagram illustrating a vehicle wireless sensor network system according to an embodiment of the present invention.
Figure 3:
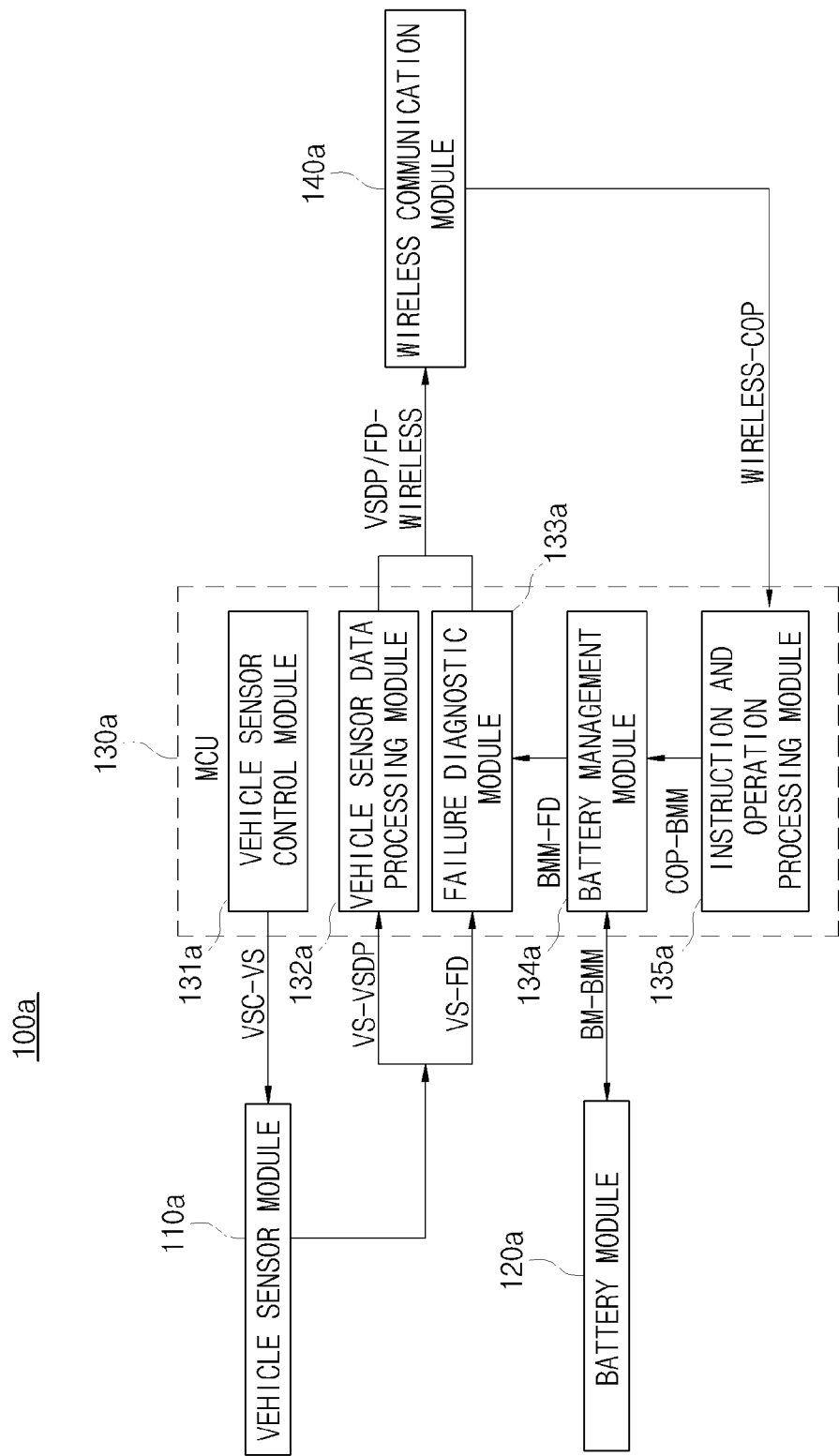
FIG. 3 is a configuration diagram illustrating architecture of a vehicle wireless sensor node according to an embodiment of the present invention.
Figure 4:
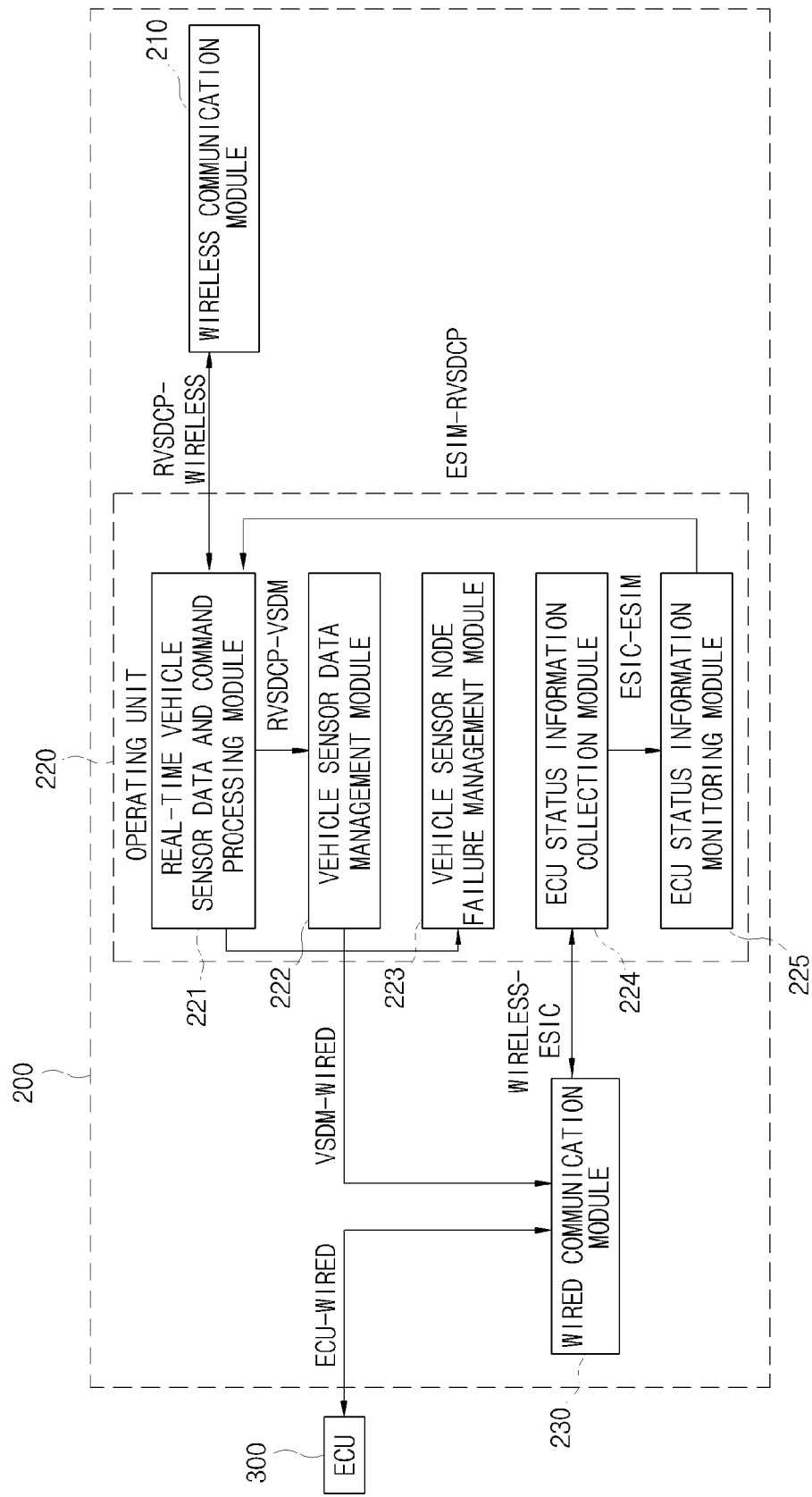
FIG. 4 is a configuration diagram illustrating architecture of a vehicle base station according to an embodiment of the present invention.

FIG. 1 is a block diagram illustrating a vehicle wireless sensor network system according to an embodiment of the present invention, FIG. 2 is a diagram illustrating a vehicle wireless sensor network system according to an embodiment of the present invention, FIG. 3 is a configuration diagram illustrating architecture of a vehicle wireless sensor node according to an embodiment of the present invention, and FIG. 4 is a configuration diagram illustrating architecture of a vehicle base station according to an embodiment of the present invention.

As illustrated in FIG. 1, the vehicle wireless sensor network system according to an embodiment of the present invention includes a plurality of vehicle wireless sensor nodes 100*a*, 100*b*, . . . , a vehicle base station 200, an electronic control unit (ECU) 300, and a head unit 400.

Here, the ECU 300 is used in a vehicle, and includes an engine control unit 300*a*, an airbag control unit (ACU), a convenience control unit (CCU), and the like.

The vehicle wireless sensor nodes 100*a*, 100*b*, . . . may include an air conditioner sensor node, a front detection sensor node, a tire pressure monitoring system (TPMS) sensor node, a rear detection sensor node, and the like which are mounted in the vehicle as illustrated in FIG. 2, receive an information collection command from the vehicle base station 200, detect the vehicle according to the received information collection command, and transmit information about the detected vehicle to the vehicle base station 200 in a wireless communication manner.

For example, the vehicle wireless sensor nodes 100a, 100b, . . . may detect information about the vehicle at every predetermined period, and transmit the detected information about the vehicle to the vehicle base station 200 in a wireless communication manner. Here, when receiving the information collection command from the vehicle base station 200, the vehicle wireless sensor nodes 100a, 100b, . . . may detect the information about the vehicle separately from detecting the information about the vehicle at every predetermined period, and transmit the detected information about the vehicle to the vehicle base station 200 in a wireless communication manner.

The vehicle base station 200 collects, from the vehicle wireless sensor nodes 100a, 100b, . . . , information required for providing safety and convenience services to a driver such as in a vehicle front and rear parking assistant system, a TPMS, an air conditioning system, and the like.

For example, the vehicle base station 200 acquires and monitors status information of the ECU 300 in a wired communication manner, and transmits the information collection command according to the monitored result to the vehicle wireless sensor nodes 100a, 100b, . . . .

More specifically, the ECU 300 may transmit the status information to the vehicle base station 200 when an operation according to a driver's manipulation is generated, and transmit the status information according to a status information request command from the vehicle base station 200.

The vehicle base station 200 monitors, when acquiring the status information from the ECU 300 according to a gear manipulation of the driver, the acquired status information, recognizes that an operation mode of the vehicle is a rear parking mode according to a gear's position of "R" based on the monitored result, and transmits the information collection command about a rear side of the vehicle to the rear detection sensor node.

In addition, the vehicle base station 200 analyzes the information about the vehicle received from the vehicle wireless sensor nodes 100a, 100b, . . . , in real time, and processes only information required for the ECU 300 among the information about the vehicle received from the vehicle wireless sensor nodes 100a, 100b, . . . to be transmitted to the ECU 300.

For example, the vehicle base station 200 analyzes vehicle interior temperature information received from the air conditioner sensor node, and transmits the received vehicle interior temperature information to the ECU 300 when an interior temperature of the vehicle is a predetermined temperature or higher based on the analyzed result, so that a cooling device is driven in order to adjust the interior temperature of the vehicle.

In addition, the vehicle base station 200 may analyze tire pressure information received from the TPMS sensor node, transmit, to the ECU 300, the tire pressure information received in order to notify the corresponding driver that a front left tire of the vehicle has abnormality for the purpose of repair or replacement when the analyzed tire pressure information corresponds to the front left tire and the tire pressure is a predetermined tire pressure or lower based on the analyzed result, and directly notify the driver of the received tire pressure information through the head unit 400.

In this manner, according to an embodiment of the present invention, the information about the vehicle may be received from each of the vehicle wireless sensor nodes to be processed in real time, and the information about the vehicle collected from each of the vehicle wireless sensor nodes may be also processed in real time to correspond to the status information of the ECU 300, and therefore it is possible to accurately provide safety and convenience services at a time when the safety and convenience services are required by the corresponding driver.

Hereinafter, architecture of a vehicle wireless sensor node according to an embodiment of the present invention will be described in more detail with reference to FIG. 3.

As illustrated in FIG. 3, the vehicle wireless sensor node 100a according to an embodiment of the present invention is operated at every predetermined period or operated according to a command received from the vehicle base station 200, acquires sensor information inside/outside the vehicle through vehicle sensors of the vehicle, and transmits the acquired sensor information to the vehicle base station 200. Here, the vehicle wireless sensor node 100a includes a vehicle sensor module 110a, a battery module 120a, a micro control unit (MCU) 130a, and a wireless communication module 140a.

The vehicle sensor module 110a has at least one of vehicle sensors (ultrasonic sensor, humidity sensor, TPMS sensor, temperature sensor, air conditioning sensor, and the like), acquires sensor data inside/outside the vehicle through the vehicle sensors, and transmits the acquired sensor data to the MCU 130a.

The battery module 120a supplies power using a battery in order to operate the vehicle wireless sensor node 100a.

Meanwhile, the power supply of the vehicle wireless sensor node 100a is basically performed by the battery, and when power consumption is a predetermined value or more during operation of the vehicle wireless sensor node 100a, the power supply from a constant power source of the vehicle should be reliably performed.

In addition, a power supply method of the vehicle wireless sensor node 100a is not limited thereto, and obviously, may be changed according to a demand of a developer or a user.

The MCU 130a includes a vehicle sensor control module 131a, a vehicle sensor data processing module 132a, a failure diagnostic module 133a, a battery management module 134a, and an instruction and operation processing module 135a.

The vehicle sensor control module 131a controls operations of the vehicle sensor module 110a such as enabling at least one vehicle sensor of the vehicle sensor module 110a to detect sensor data inside/outside the vehicle.

For example, the vehicle sensor control module 131a transmits control signals to the vehicle sensor module 110a through a vehicular sensor control-vehicular sensor (VSC-VS) interface so that the vehicle sensor module 110a can detect the sensor data inside/outside the vehicle through the at least one vehicle sensor.

The vehicle sensor data processing module 132a receives unprocessed sensor data from the vehicle sensor module 110a through a vehicular sensor-vehicular sensor data processing (VS-VSDP) interface, preferentially processes urgent data among the sensor data transmitted from the vehicle sensor module 110a, and transmits the urgent data processed to be transmitted to the vehicle base station 200, to the wireless communication module 140a through a vehicular sensor data processing/failure diagnosis-wireless (VSDP/FD-WIRELESS) interface.

For example, when the number of the vehicle sensors which the vehicle sensor module 110a has is two or more, the vehicle sensor data processing module 132a classifies the sensor data received from each of the vehicle sensors based on a predetermined degree of urgency according to a kind of the vehicle sensor, as illustrated in Table 1.

TABLE 1

| Kind of Sensor | Degree of urgency (max = 5) |
|---|---|
| TPMS sensor | 4.5 |
| Temperature sensor | 2 |

More specifically, when the vehicle wireless sensor node 100a is a TPMS wireless sensor node, receives sensor data from the TPMS sensor, and receives sensor data from the temperature sensor, the vehicle sensor data processing module 132a may preferentially process the sensor data received from the TPMS sensor rather than the sensor data received from the temperature sensor because the degree of urgency of the sensor data received from the TPMS sensor is 4.5 and the degree of urgency of the sensor data received from the temperature sensor is 2, and transmit the processed sensor data to the wireless communication module 140a so that the processed sensor data can be transmitted to the vehicle base station 200.

The failure diagnostic module 133a receives unprocessed detected sensor data from the vehicle sensor module 110a, analyzes the received sensor data, and detects abnormality of the vehicle sensor or a hardware circuit of the vehicle sensor based on the analyzed result to diagnose whether a failure occurs.

For example, the failure diagnostic module 133a analyzes battery information of the vehicle wireless sensor node 100a, diagnoses whether a charging amount of a battery is sufficient for the operation of the vehicle wireless sensor node 100a based on the analyzed result or diagnoses whether a failure of the vehicle sensor occurs based on the sensor data (sensor signals) transmitted from the vehicle sensor module 110a and predetermined failure determination information, and transmits diagnostic information to the wireless communication module 140a through the VSDP/FD-WIRELESS interface so as to transmit the diagnostic information to the vehicle base station 200.

More specifically, the predetermined failure determination information is obtained in such a manner that a pattern of signals corresponding to the failure of the vehicle sensor is stored in a lookup table in advance, and the failure diagnostic module 133a samples the sensor signals received from the vehicle sensor in the same manner as in signals stored in the lookup table with respect to a predetermined section, and quantizes a signal level of the sampled sensor signals in the same manner as in the signals stored in the lookup table.

The failure diagnostic module 133a determines whether the failure of the vehicle sensor occurs based on a result value calculated by substituting, for Equation 1, a value obtained by sampling the sampled and quantized sensor signals, the signals stored in the lookup table, and the sensor signals.

$$\text{Result value} = (\text{sensor signal}[\text{Signal}_{receive}] \times \text{signals stored in lookup table } [\text{Signal}_{lookuptable}])/\text{value obtained by sampling signal} \quad [\text{Equation 1}]$$

For example, the failure diagnostic module 133a diagnoses that the failure of the vehicle sensor occurs when the result value calculated by Equation 1 is a predetermined value (1), and transmits diagnostic information to the vehicle base station 200 through the wireless communication module 140a.

The battery management module 134a receives battery information of the vehicle wireless sensor node 100a from the battery module 120a through a battery module-battery management module (BM-BMM) interface, and transmits the battery information transmitted from the battery module 120a to the failure diagnostic module 133a through a battery management module-failure diagnosis (BMM-FD) interface.

For example, in order to manage the battery of the vehicle wireless sensor node 100a, the battery management module 134a switches an operation mode into a power saving mode when the overall tasks of the vehicle wireless sensor node 100a are in an idle state, and transmits the battery information to the failure diagnostic module 133a so as to determine whether a residual amount of the battery is insufficient for the operation of the vehicle wireless sensor node 100a.

The instruction and operation processing module 135a processes an operation command received from the vehicle base station 200 through the wireless communication module 140a, and operates and manages the tasks of the vehicle wireless sensor nodes 100a.

In addition, the instruction and operation processing module 135a transmits, to the battery management module 134a, operation status information of the tasks such as information whether the tasks of the vehicle wireless sensor node 100a are in the idle state through a command operation processing-battery management module (COP-BMM) interface.

The wireless communication module 140a transmits sensor information inside/outside the vehicle to the vehicle base station 200, and receives various operation commands from the vehicle base station 200.

For example, the wireless communication module 140a receives, from the failure diagnostic module 133a, the sensor information transmitted from the vehicle sensor data processing module 132a through the VSDP/FD-WIRELESS interface, and the failure information concerning that the residual amount of the battery is diagnosed to be insufficient or abnormality of the vehicle sensor module is detected.

In addition, the wireless communication module 140a transmits, to the instruction and operation processing module 135a, the operation command information received from the vehicle base station 200 through a wireless-command operation processing (WIRELESS-COP) interface.

In this manner, the vehicle wireless sensor node 100a may more stably and efficiently process data by transmitting or receiving the data through the predetermined interface between the respective constituent modules, and therefore it is possible to more smoothly perform information collection and transmission of the collected information according to the command received from the vehicle base station 200.

Hereinafter, a vehicle base station according to an embodiment of the present invention will be described in more detail with reference to FIG. 4.

As illustrated in FIG. 4, the vehicle base station 200 according to an embodiment of the present invention may analyze and process sensor information received from the vehicle wireless sensor nodes 100a, 100b, . . . in real time, monitor status information acquired from the ECU 300 of the vehicle, generate an operation command according to the monitored result, and transmit the generated operation command to the vehicle wireless sensor nodes 100a, 100b, . . . . The vehicle base station 200 includes a wireless communication module 210, an operating unit 220, and a wired communication module 230.

The wireless communication module 210 receives sensor information inside/outside the vehicle from the vehicle wireless sensor nodes 100a, 100b, . . . , and transmits various commands to the vehicle wireless sensor nodes 100a, 100b, . . . .

The operating unit 220 operates the vehicle base station 200 through an operating system such as Linux or the like, and includes a real-time vehicle sensor data and command processing module 221, a vehicle sensor data management module 222, a vehicle sensor node failure management module 223, an ECU status information collection module 224, and an ECU status information monitoring module 225.

The real-time vehicle sensor data and command processing module 221 receives sensor information from the wireless communication module 210 through a real-time vehicular sensor data/command processing wireless (RVSDCP-WIRELESS) interface, and transmits commands for operating the vehicle wireless sensor nodes 100a, 100b, . . . to the wireless communication module 210.

For example, the real-time vehicle sensor data and command processing module 221 analyzes and processes the sensor information (data) of the vehicle wireless sensor nodes 100a, 100b, . . . received through the wireless communication module 210 in real time according to an urgent priority.

More specifically, the real-time vehicle sensor data and command processing module 221 sets the priority of the sensor data received from the vehicle wireless sensor nodes 100a, 100b, . . . using a predetermined lookup table in which a degree of urgency of each piece of the sensor data, a weight (%) of safety to the vehicle of each piece of the sensor data, and a weight (%) of convenience to the vehicle of each piece of the sensor data are set in advance according to service applications and a kind of the vehicle sensor.

TABLE 2

| Application | Kind of sensor | Degree of urgency (max = 5) | Vehicle safety weight (%) | Vehicle convenience weight (%) |
| --- | --- | --- | --- | --- |
| Vehicle front/rear parking assistance | Ultrasonic sensor | 5 | 95 | 5 |
| | Humidity sensor | 1 | 10 | 90 |
| Tire pressure monitoring | TPMS sensor | 4.5 | 90 | 10 |
| | Temperature sensor | 2 | 30 | 70 |

Result value=(degree of urgency×vehicle safety weight($[W_{safe}]$))+(degree of urgency×vehicle convenience weight$[W_{convenience}]$)  [Equation 2]

For example, as shown in Table 2, the real-time vehicle sensor data and command processing module 221 calculates result values by substituting each value of the predetermined lookup table for Equation 2, and determines an urgent priority of each piece of the received sensor data by comparing the calculated result values.

Hereinafter, an example in which sensor information (hereinafter, referred to as "information A") detected by the humidity sensor is received from the rear detection sensor node and sensor information (hereinafter, referred to as "information B") detected by the TPMS sensor is received from the TPMS sensor node will be described.

The real-time vehicle sensor data and command processing module 221 respectively calculates a result value of the information A as 100 and a result value of the information B as 450 by substituting, for Equation 2, a degree of urgency of the information A of 1, a vehicle safety weight of the information A of 10, a vehicle convenience weight of the information A of 90, a degree of urgency of the information B of 4.5, a vehicle safety weight of the information B of 90, and a vehicle convenience weight of the information B of 10 which are set in advance by utilizing Table 2.

The real-time vehicle sensor data and command processing module 221 determines that the information B has a higher urgent priority than that of the information A by comparing the calculated result values, and preferentially analyzes and processes the information B.

In addition, the real-time vehicle sensor data and command processing module 221 analyzes the sensor information according to the urgent priority through a real-time vehicular sensor data/command processing-vehicular sensor data management (RVSDCP-VSDM) interface, transmits the processed sensor information to the vehicle sensor data management module 222, and transmits failure diagnostic information of the vehicle wireless sensor node among the sensor data analyzed and processed according to the urgent priority through a real-time vehicular sensor data/command processing-vehicular sensor node failure management (RVSDCP-VSNFM) interface to the vehicle sensor node failure management module 223.

The vehicle sensor data management module 222 transmits the sensor information transmitted from the vehicle sensor data and command processing module 221 to the wired communication module 230 through a vehicular sensor data management wired (VSDM-WIRED) interface, and enables the wired communication module 230 to transmit the sensor information to the ECU 300.

For example, the vehicle sensor data management module 222 manages the sensor information of the vehicle wireless sensor nodes 100a, 100b, . . . which are analyzed and processed by the real-time vehicle sensor data and command processing module 221 according to the set urgent priority, and transmits the required sensor information to the ECU 300 through the wired communication module 230.

The vehicle sensor node failure management module 223 manages failure diagnostic information of the vehicle wireless sensor node transmitted from the real-time vehicle sensor data and command processing module 221, that is, failure information such as battery shortage information, vehicle sensor abnormality information, and the like.

The ECU status information collection module 224 transmits a command for requesting status information of the ECU 300 to the wired communication module 230 through a wired-ECU status information collection (WIRED-ESIC) interface, or receives the status information of the ECU 300 from the wired communication module 230.

For example, the ECU status information collection module 224 transmits the command for requesting the status information of the ECU 300 through the wired communication module 230 connected to the ECU 300, and collects the status information of the ECU 300 according to the information request command.

In addition, the ECU status information collection module 224 transmits the status information of the ECU 300 to the ECU status information monitoring module 225 through an ECU status information collection-ECU status information monitoring (ESIC-ESIM) interface.

The ECU status information monitoring module 225 transmits the status information of the ECU 300 to the vehicle sensor data and command processing module 221 through an ECU status information monitoring-real-time vehicular sensor data/command processing (ESIM-RVSDCP) interface.

For example, the ECU status information monitoring module 225 monitors the status information of the ECU 300 acquired through the ECU status information collection module 224, and transmits, to the real-time vehicle sensor data and command processing module 221, the status information of the ECU 300 required for generating the commands for operating the vehicle wireless sensor nodes 100a, 100b, . . . according to the status information of the ECU 300.

The wired communication module 230 transmits a command for requesting the status information and sensor information required for the ECU 300 to the ECU 300 through an ECU-WIRED interface, or receives the status information according to the request from the ECU 300.

For example, the wired communication module 230 acquires the status information of the ECU 300 in conjunction with the ECU 300 using a wired communication network inside the vehicle, or transmits the sensor information to the ECU 300.

That is, the vehicle base station 200 may be linked with the network inside the vehicle in which the vehicle base station 200 is mounted among various wired networks (CAN, LIN, FlexRay, MOST, and the like) variously constituted for each vehicle, using the wired communication module 230, and acquire the status information of the ECU 300.

In this manner, the vehicle base station 200 may more stably and efficiently process data by transmitting and receiving the data through the predetermined interface between the respective constituent modules, and therefore it is possible to more smoothly perform information collection from the vehicle wireless sensor nodes 100a, 100b, . . . and transmission of the collected information to the ECU 300.

Figure 5:
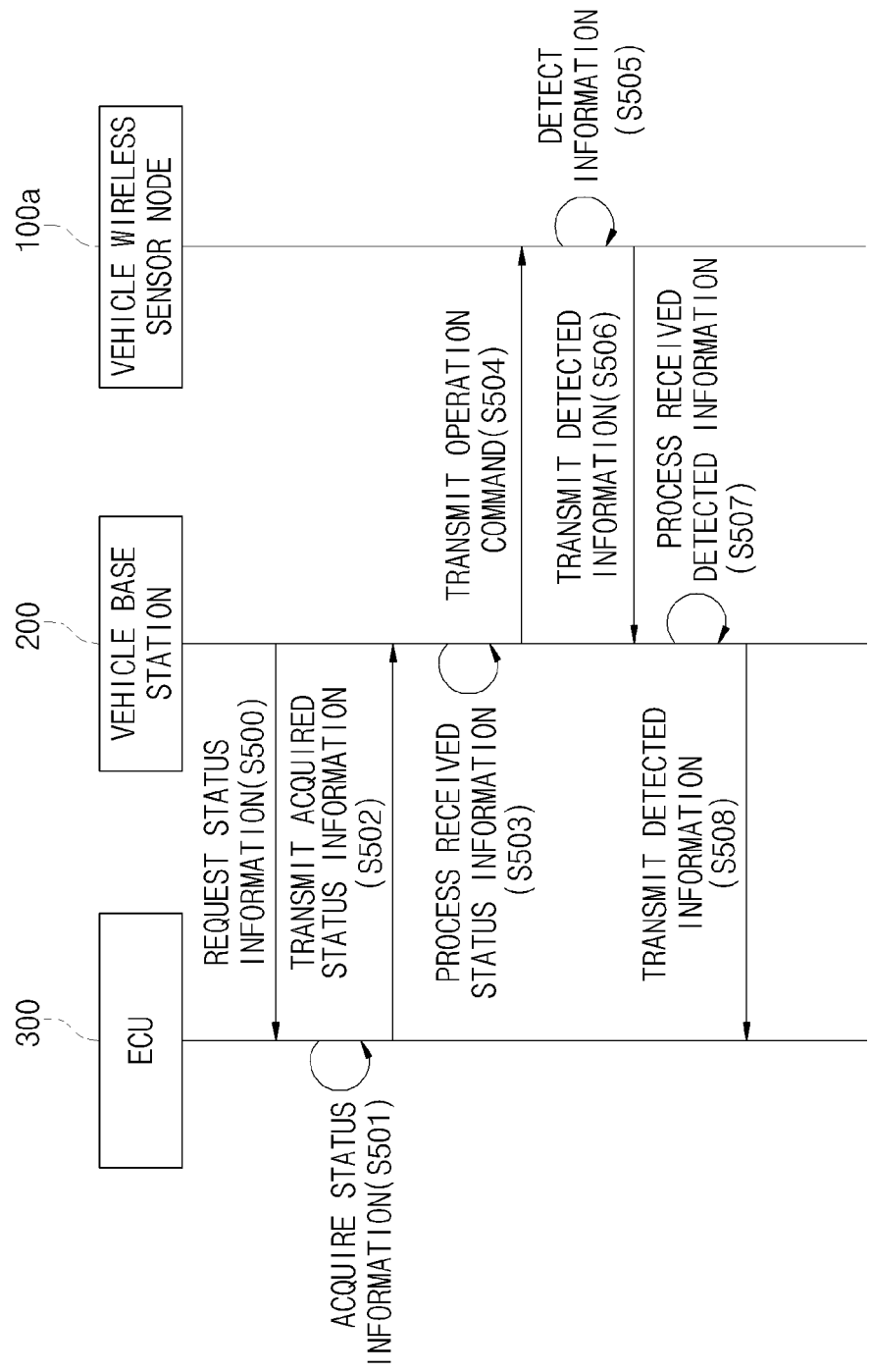
FIG. 5 is a diagram illustrating an operating method of a vehicle wireless sensor network system according to an embodiment of the present invention.

As above, the vehicle wireless sensor network system according to an embodiment of the present invention has been described with reference to FIGS. 1 to 4, and hereinafter, an operating method of the vehicle wireless sensor network system according to an embodiment of the present invention will be described with reference to FIG. 5. FIG. 5 is a diagram illustrating an operating method of a vehicle wireless sensor network system according to an embodiment of the present invention.

As illustrated in FIG. 5, in operation S500, the vehicle base station 200 transmits a command for requesting status information to the ECU 300.

The ECU 300 acquires the status information according to a status information request command of the vehicle base station 200 in operation S501, and transmits the acquired status information to the vehicle base station 200.

The vehicle base station 200 collects and monitors the status information from the ECU 300 in operation S503, and transmits an operation command to the vehicle wireless sensor node 100a according to the monitored status information of the ECU 300 in operation S504.

The vehicle wireless sensor node 100a detects sensor information according to the received operation command in operation S505, and transmits the detected sensor information to the vehicle base station 200 in operation S506.

The vehicle base station 200 analyzes and processes the sensor information received from the vehicle wireless sensor node 100a in real time in operation S507, and transmits the required sensor information to the ECU 300 in operation S508.

As described above, according to the embodiments of the present invention, collection and processing of information required for providing safety and convenience services of the vehicle may be more efficiently and stably performed, such as generating a collection command of information required for providing services according to the status information of the ECU of the vehicle, transmitting the generated collection command to the wireless sensor node corresponding to the service, transmitting the information required for providing services among information collected from a plurality of wireless sensor nodes to the ECU of the vehicle, and the like.

In addition, the safety and convenience related services of the vehicle may be more smoothly provided to a driver.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A vehicle wireless sensor network system comprising:
   at least one vehicle wireless sensor node that is mounted in a vehicle and detects information about the vehicle in an arbitrary position of the vehicle; and
   a vehicle base station that collects sensor information from the vehicle wireless sensor node by using wireless communication and collects information from an electronic control unit (ECU) of the vehicle, generates an information collection command based on the information collected from the ECU of the vehicle to transmit the generated information collection command to the vehicle wireless sensor node to perform the generated information collection command, and sets a priority of each piece of the sensor information according to predetermined priority information of each of the vehicle wireless sensor nodes, analyzes the sensor information according to the set priority, and selectively transmits the analyzed sensor information to the ECU of the vehicle through the wired communication.

2. The vehicle wireless sensor network system of claim 1, wherein the vehicle wireless sensor node detects the information about the vehicle to correspond to each provision service of the vehicle, and the vehicle base station sets the priority of each piece of the sensor information according to a provision service and a kind of a sensor which correspond to each of the vehicle wireless sensor nodes and selectively transmits each piece of the sensor information to the ECU of the vehicle according to the set priority.

3. The vehicle wireless sensor network system of claim 2, wherein the vehicle base station sets the priority of each piece of the sensor information using a lookup table in which a degree of urgency of each piece of the sensor information, a weight of each piece of the sensor information to vehicle safety, and a weight of each piece of the sensor information to vehicle convenience are set in advance.

4. The vehicle wireless sensor network system of claim 3, wherein the vehicle base station calculates a first result value by multiplying each of the degrees of urgency by each of the weights to vehicle convenience, calculates a second result value by multiplying each of the degrees of urgency by each of the weights to vehicle safety, and calculates each of the result values as the priority of each piece of the sensor information by adding the calculated first and second result values.

5. The vehicle wireless sensor network system of claim 1, wherein the vehicle base station includes
   a wireless communication module that performs wireless communication with the vehicle wireless sensor node,
   a wired communication module that performs wired communication with the ECU of the vehicle, and
   an operating unit that sets the priority of each piece of the sensor information, analyzes the sensor information according to the set priority, and selectively transmits the analyzed sensor information to the ECU of the vehicle through the wired communication module.

6. The vehicle wireless sensor network system of claim 5, wherein the operating unit includes
a real-time vehicle sensor data and command processing module that sequentially analyzes the sensor information according to the priority, and selectively transmits the analyzed information to the ECU of the vehicle, and
an ECU status information monitoring module that generates the information collection command, and transmits the information collected from the ECU of the vehicle to the real-time vehicle sensor data and command processing module so as to transmit the generated information collection command to the vehicle wireless sensor node to perform the generated information collection command.

7. The vehicle wireless sensor network system of claim 1, wherein each of the vehicle wireless sensor nodes includes
a vehicle sensor module that includes at least one sensor for detecting the information about the vehicle,
a wireless communication module that wirelessly communicates with the vehicle base station, and
a micro controller unit (MCU) that controls the vehicle sensor module to detect the information about the vehicle according to the information collection command received from the vehicle base station through the wireless communication module.

8. The vehicle wireless sensor network system of claim 7, wherein the MCU includes
a failure diagnostic module that diagnoses whether a failure of the sensor occurs based on a lookup table in which a signal pattern corresponding to the failure of the sensor is stored and information detected by the sensor, and transmits diagnostic information to the vehicle base station,
a battery management module that enables the vehicle wireless sensor node to be operated in a power saving mode when the overall tasks of the vehicle wireless sensor node are in an idle state, and
a vehicle sensor data processing module that processes, when the number of the at least one sensor is two or more, information detected by each sensor according to a degree of urgency set in advance for each sensor, and sequentially transmits the processed information to the vehicle base station.

9. The vehicle wireless sensor network system of claim 8, wherein the failure diagnostic module samples sensor signals detected by the sensor in the same manner as in signals stored in the lookup table with respect to a predetermined section, quantizes a signal level of the sampled sensor signals in the same manner as in the signals stored in the lookup table, and diagnoses whether the failure of the sensor occurs according to a compared result between the quantized sensor signals and the signals stored in the lookup table.

10. An operating method of a vehicle wireless sensor network system which includes a vehicle base station and at least one vehicle wireless sensor node, the operating method comprising:
collecting, by the vehicle base station, information from an electronic control unit (ECU) of a vehicle by using wired communication and sensor information from the vehicle wireless sensor node mounted in an arbitrary position of the vehicle by using wireless communication;
generating an information collection command based on the information collected from the ECU of the vehicle, and transmitting the generated information collection command to the vehicle wireless sensor node to perform the generated information collection command;
setting a priority of each piece of the sensor information according to predetermined priority information of each of the vehicle wireless sensor nodes;
analyzing the sensor information according to the set priority; and
selectively transmitting the analyzed sensor information to the ECU of the vehicle through wired communication.

11. The operating method of claim 10, wherein
the vehicle wireless sensor node detects information about the vehicle to correspond to each provision service of the vehicle, and
setting the priority of each piece of the sensor information includes setting the priority according to a provision service and a kind of a sensor each corresponding to the vehicle wireless sensor node.

12. The operating method of claim 11, wherein the setting of the priority includes setting the priority of the sensor information using a lookup table in which a degree of urgency of the sensor information, a weight of the sensor information to vehicle safety, and a weight of the sensor information to vehicle convenience are set in advance.

13. The operating method of claim 12, wherein the setting of the priority includes
calculating a first result value by multiplying the degree of urgency by the weight to vehicle convenience, and calculating a second result value by multiplying the degree of urgency by the weight to vehicle safety, and
calculating a final result value as the priority of the sensor information by adding the calculated first and second result values.

14. The operating method of claim 10, wherein the vehicle base station includes
a wireless communication module that performs wireless communication with the vehicle wireless sensor node,
a wired communication module that performs wired communication with the ECU of the vehicle, and
an operating unit that sets the priority of each piece of the sensor information collected through the wireless communication module, analyzes the information collected from the vehicle wireless sensor node according to the set priority, and selectively transmits the analyzed information to the ECU of the vehicle through the wired communication module.

15. The operating method of claim 14, wherein the operating unit includes
a real-time vehicle sensor data and command processing module that sequentially analyzes the sensor information according to the priority, and selectively transmits the analyzed information to the ECU of the vehicle, and
an ECU status information monitoring module that generates the information collection command, and transmits the information collected from the ECU of the vehicle to the real-time vehicle sensor data and command processing module so as to transmit the generated information collection command to the vehicle wireless sensor node to perform the generated information collection command.

16. The operating method of claim 10, wherein each of the at least one vehicle wireless sensor node includes
a vehicle sensor module that includes at least one sensor for detecting information about the vehicle,
a wireless communication module that wirelessly communicates with the vehicle base station, and an MCU that controls the sensor to detect the information about the vehicle according to the information collection command received from the vehicle base station through the wireless communication module.

17. The operating method of claim 16, wherein the MCU includes
a failure diagnostic module that diagnoses whether a failure of the sensor occurs based on a lookup table in which a signal pattern corresponding to the failure of the sensor is stored and the information detected by the sensor, and transmits diagnostic information to the vehicle base station,
a battery management module that enables the vehicle wireless sensor node to be operated in a power saving mode when the overall tasks of the vehicle wireless sensor node are in an idle state, and
a vehicle sensor data processing module that processes, when the number of the sensors is two or more, the information detected by each sensor according to a degree of urgency set in advance for each sensor, and sequentially transmits the processed information to the vehicle base station.

18. The operating method of claim 17, wherein the failure diagnostic module samples sensor signals detected by the sensor in the same manner as in signals stored in the lookup table with respect to a predetermined section, quantizes a signal level of the sampled sensor signals in the same manner as in the signals stored in the lookup table, and diagnoses whether the failure of the sensor occurs according to a compared result between the quantized sensor signals and the signals stored in the lookup table.

19. A vehicle base station included in a vehicle wireless sensor network system which includes at least one vehicle wireless sensor node, comprising:
a real-time vehicle sensor data and command processing module that sets a priority of information received from each of the at least one vehicle wireless sensor node mounted in an arbitrary position of a vehicle according to a provision service of the vehicle and a kind of each sensor which correspond to each of the at least one vehicle wireless sensor node, and processes information received according to the set priority;
a vehicle sensor data management module that transmits, to an ECU of the vehicle, information concerning the provision service of the vehicle among the information processed by the real-time vehicle sensor data and command processing module;
a vehicle sensor node failure management module that manages failure information including at least one of information about lack of a battery residual amount of the vehicle wireless sensor node and information about abnormality thereof among the information processed by the real-time vehicle sensor data and command processing module;
an ECU status information collection module that transmits an information request command to the ECU of the vehicle, and collects information according to the transmitted information request command from the ECU; and
an ECU status information monitoring module that monitors the information collected from the ECU, generates an information collection command corresponding to the monitored information, and transmits the monitored information to the real-time vehicle sensor data and command processing module so as to transmit the generated information collection command to the vehicle wireless sensor node to perform the generated information collection command,
wherein the information collected from the ECU of the vehicle is status information of the vehicle that is based on a driver's operation of the vehicle.

* * * * *